US008152221B2

(12) United States Patent
Yoshioka

(10) Patent No.: US 8,152,221 B2
(45) Date of Patent: Apr. 10, 2012

(54) VEHICLE SLIDE DOOR STRUCTURE

(75) Inventor: Junichi Yoshioka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 146 days.

(21) Appl. No.: 12/679,852

(22) PCT Filed: Dec. 25, 2008

(86) PCT No.: PCT/JP2008/073941
§ 371 (c)(1),
(2), (4) Date: Mar. 30, 2010

(87) PCT Pub. No.: WO2009/087947
PCT Pub. Date: Jul. 16, 2009

(65) Prior Publication Data
US 2010/0263283 A1   Oct. 21, 2010

(30) Foreign Application Priority Data
Jan. 9, 2008   (JP) .................................. 2008-001936

(51) Int. Cl.
*B60J 5/06* (2006.01)
(52) U.S. Cl. ..................................................... 296/155
(58) Field of Classification Search ................. 296/155, 296/146.1, 146.11, 146.12; 292/336.3, 48, 292/DIG. 23, DIG. 46; 16/366, 370; 49/360
See application file for complete search history.

(56) References Cited

U.S. PATENT DOCUMENTS

| | | | | |
|---|---|---|---|---|
| 3,234,584 A | * | 2/1966 | Valade | 16/370 |
| 5,423,582 A | * | 6/1995 | Kleefeldt | 292/201 |
| 5,538,312 A | * | 7/1996 | Lehmkuhl | 296/97.22 |
| 5,685,046 A | * | 11/1997 | Neag et al. | 16/366 |
| 5,910,077 A | * | 6/1999 | Aumiller et al. | 49/460 |
| 5,921,613 A | * | 7/1999 | Breunig et al. | 296/155 |
| 6,030,024 A | * | 2/2000 | Schmidhuber et al. | 296/146.12 |
| 6,141,908 A | * | 11/2000 | Bowen | 49/281 |
| 6,248,172 B1 | * | 6/2001 | Shirotani et al. | 118/500 |
| 6,382,705 B1 | * | 5/2002 | Lang et al. | 296/146.12 |
| 6,842,945 B2 | * | 1/2005 | Hiramatsu | 16/366 |
| 6,997,504 B1 | * | 2/2006 | Lang et al. | 296/146.11 |
| 7,530,825 B2 | * | 5/2009 | Sato et al. | 439/162 |
| 7,644,976 B2 | * | 1/2010 | Suzuki et al. | 296/146.12 |
| 7,658,438 B1 | * | 2/2010 | Elliott et al. | 296/155 |
| 7,726,723 B2 | * | 6/2010 | Takahashi | 296/155 |
| 7,765,740 B2 | * | 8/2010 | Heuel et al. | 49/360 |
| 7,887,118 B2 | * | 2/2011 | Elliott et al. | 296/155 |

(Continued)

FOREIGN PATENT DOCUMENTS
DE   103 26 241 A1   1/2005
(Continued)

*Primary Examiner* — Kiran B Patel
(74) *Attorney, Agent, or Firm* — Carrier Blackman & Associates, P.C.; Joseph P. Carrier; William D. Blackman

(57) ABSTRACT

Vehicle slide door structure includes a lower slide rail (42) provided on a slide door (21), and a link mechanism (81) provided between a vehicle body (11) and the slide rail (42). The link mechanism (81) is pivotably connected at one end portion to the vehicle body (11) and pivotably and slidably connected at the other end portion to the slide rail (42). The link mechanism (81) includes a plurality of linkages or link members (84, 85) and connection sections (96, 98, 101) where the linkages or link members are pivotably connected with each other between the one end portion and the other end portion of the link mechanism.

11 Claims, 11 Drawing Sheets

U.S. PATENT DOCUMENTS

| | | | |
|---|---|---|---|
| 7,896,425 B2 * | 3/2011 | Elliott et al. | 296/146.12 |
| 7,901,019 B2 * | 3/2011 | Laundroche et al. | 312/405 |
| 7,930,811 B2 * | 4/2011 | Yoshida et al. | 29/281.5 |
| 7,950,109 B2 * | 5/2011 | Elliott et al. | 16/366 |
| 8,007,026 B2 * | 8/2011 | Scott et al. | 296/146.12 |
| 2004/0256882 A1 * | 12/2004 | McRobert | 296/146.11 |
| 2005/0241105 A1 * | 11/2005 | Wiley | 16/266 |
| 2006/0249983 A1 * | 11/2006 | Heuel et al. | 296/155 |
| 2009/0000200 A1 | 1/2009 | Heuel et al. | |
| 2009/0107050 A1 * | 4/2009 | Suzuki | 49/360 |
| 2009/0200833 A1 * | 8/2009 | Heuel et al. | 296/155 |
| 2010/0095595 A1 * | 4/2010 | Hanaki et al. | 49/359 |
| 2010/0181797 A1 * | 7/2010 | Hitomi | 296/146.5 |
| 2010/0295337 A1 * | 11/2010 | Elliott et al. | 296/202 |

FOREIGN PATENT DOCUMENTS

| | | |
|---|---|---|
| DE | 10 2004 039 885 A | 2/2006 |
| EP | 2 008 846 A2 | 12/2008 |
| EP | 2 008 846 A3 | 12/2008 |
| JP | 55-008952 A | 1/1980 |
| JP | 09-272343 A | 10/1997 |
| JP | 09-277833 | 10/1997 |

* cited by examiner

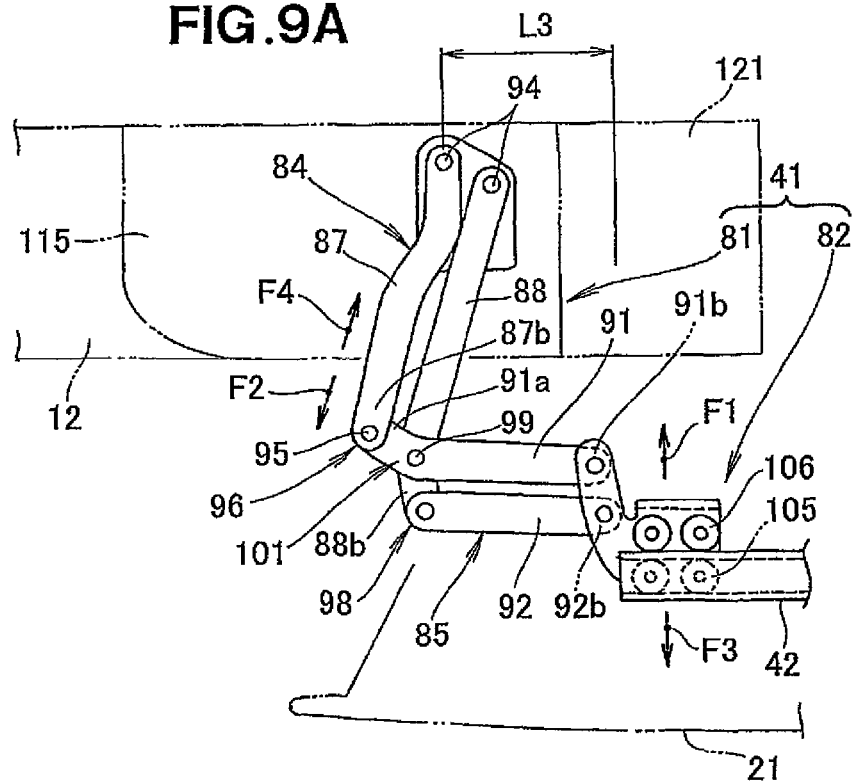
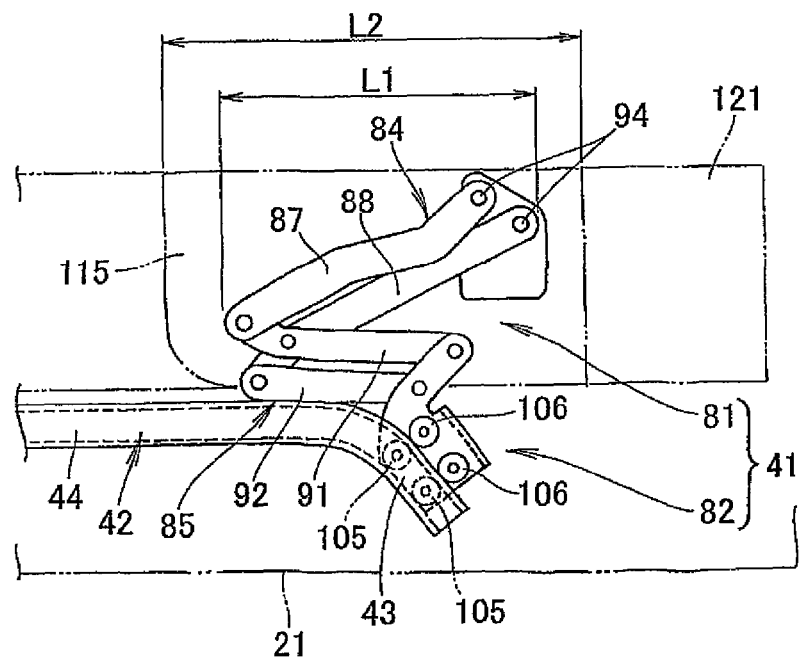

VEHICLE SLIDE DOOR STRUCTURE

TECHNICAL FIELD

The present invention relates to vehicle slide door structures for openably/closably supporting a slide door on a vehicle body.

BACKGROUND ART

Among the conventionally-known vehicle slide door structures are ones where a guide rail extending in a front-rear direction of the vehicle is provided on a slide door and connected to the vehicle body via a parallel link mechanism. As disclosed, for example, in JP 09-277833 A, the parallel link mechanism includes two parallel links that are pivotably connected at their respective proximal end portions to the vehicle body and pivotably and slidably connected at their distal end portions to the guide rail.

With the slide door structure disclosed in JP 09-277833 A, a slide door opening section can be opened by the two parallel links being pivoted about the proximal end portions to move the slide door away from the vehicle body and then the slide door being slid toward the rear of the vehicle along the distal end portions of the two parallel links. However, to open the slide door, there is a need to move the slide door a predetermined distance away from the vehicle body, and the two parallel links have to have great lengths. Therefore, an operating range of the two parallel links necessary for opening the slide door would become considerably great, which undesirably makes it difficult to secure a sufficient space through which a passenger can get in/off the vehicle (such a space will hereinafter be referred to as "getting in/off opening" or "getting in/off space").

DISCLOSURE OF THE INVENTION

It is therefore an object of the present invention to provide an improved vehicle slide door structure which can secure a sufficient getting in/off opening or space and thereby allows a passenger to readily get in/off the vehicle in a comfortable posture.

In order to accomplish the aforementioned object, the present invention provides an improved vehicle slide door structure, which comprises: a slide rail provided on a slide door; and a link mechanism provided between a vehicle body and the slide rail, the link mechanism being pivotably connected at one end portion thereof to the vehicle body and pivotably and slidably connected at the other end portion thereof to the slide rail, the link mechanism including a plurality of link members or linkages and a connection section where the linkages are pivotably connected with each other between the one end portion and the other end portion of the link mechanism.

Because the link mechanism comprises the plurality of linkages or link members provided as separate components, the linkages can be overlappingly collapsed as the slide door is closed, and the linkages can be expanded as the slide door is opened. Thus, it is possible to reduce the overall operating range of the linkages during the opening/closing operation of the slide door. Consequently, when the slide door is in the opened position, there can be secured a sufficient getting in/off opening or space, so that a passenger can get in/off the vehicle through the space in a comfortable posture.

In an embodiment, one end portion, in a slide-door opening direction, of the slide rail is curved concavely in an outward direction of the vehicle, i.e. away from the vehicle body. With the curved portion formed on the slide rail, the link mechanism can be slid smoothly on and along the slide rail during the opening/closing operation of the slide door. Thus, it is possible for the passenger or the like to smoothly perform the operation for moving the slide door outwardly of the vehicle in order to open the slide door and the operation for moving the slide door toward the interior of the vehicle in order to close the slide door. As a consequence, the opening/closing operation of the slide door can be performed smoothly.

In an embodiment, the plurality of linkages comprises a vehicle-body-side linkage provided on the vehicle body and a door-side linkage provided on the slide door, and the vehicle-body-side linkage and the door-side linkage are overlappingly collapsible in response to the operation of the slide door. Because the vehicle-body-side linkage and door-side linkage are separate components, each of the linkages can have a reduced overall length. Thus, as the slide door is closed, the linkages can be overlappingly collapsed, so that the link mechanism in the collapsed position can have a reduced overall length. As a consequence, it is possible to even further reduce the overall operating range of the linkages during the opening/closing operation of the slide door.

In an embodiment, the vehicle-body-side linkage includes a first vehicle-body-side link and a second vehicle-body-side link that are disposed in parallel to each other, and the door-side linkage includes a first door-side link and a second door-side link that are disposed in parallel to each other. Thus, the slide door can be securely supported by the link mechanism during the opening/closing operation of the slide door, so that it is possible to avoid unwanted rattling movement of the slide door during the opening/closing operation.

In an embodiment, when the slide door is in the opened position with the link mechanism placed in the expanded position thereof, the door-side linkage extends in an opening/closing direction of the slide door while the vehicle-body-side linkage extends in an inward-outward (or width) direction of the vehicle. In this way, it is possible to prevent unwanted rattling movement of the slide door during the opening operation of the slide door.

BRIEF DESCRIPTION OF DRAWINGS

FIGS. 9A and 9B are plan views explanatory of a link mechanism employed in the vehicle slide door structure of FIG. 1;

BEST MODE FOR CARRYING OUT THE INVENTION

Figure 1:
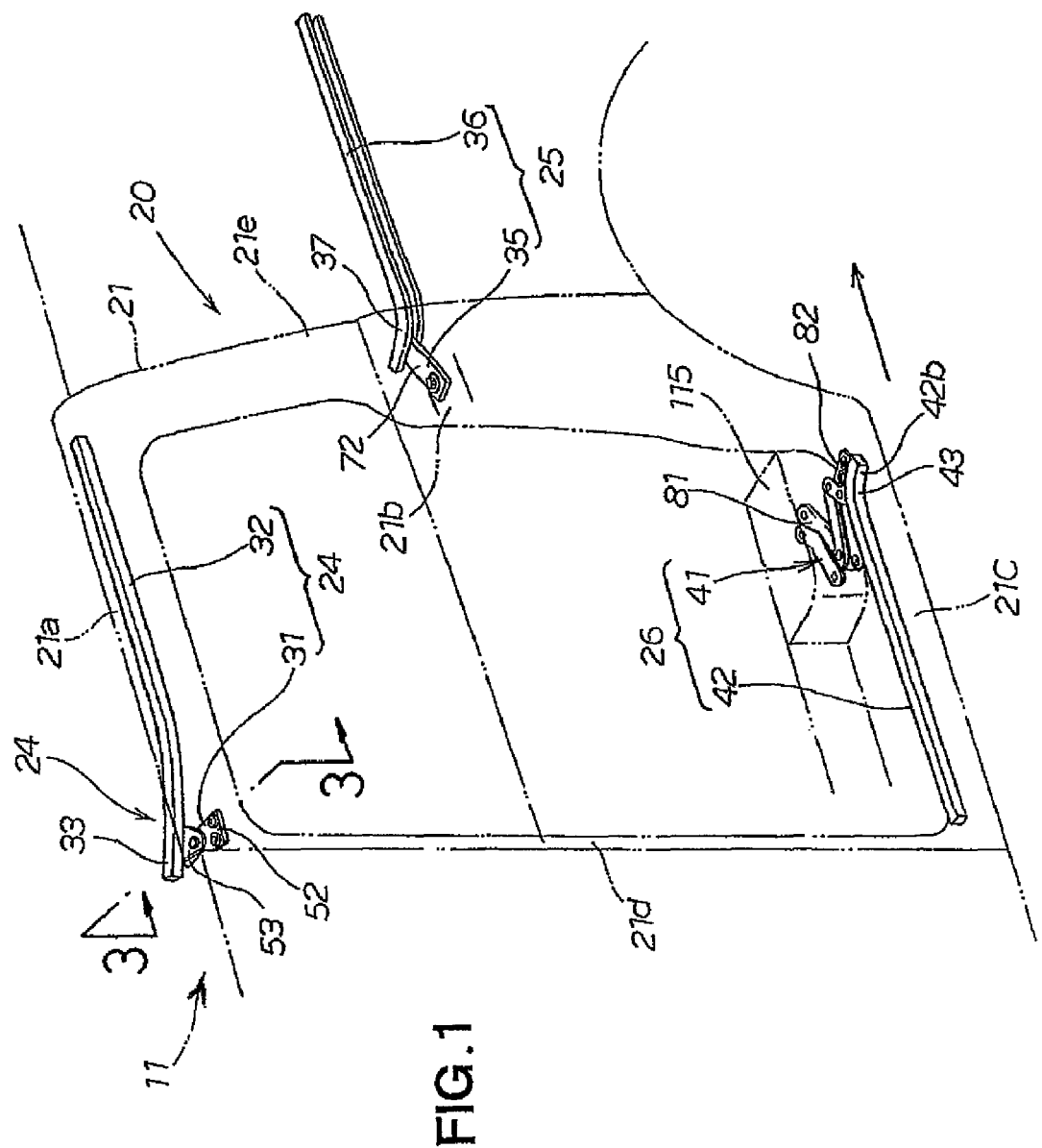
FIG. 1 is a perspective view showing an embodiment of a vehicle slide door of the present invention in a closed position.
Figure 2:
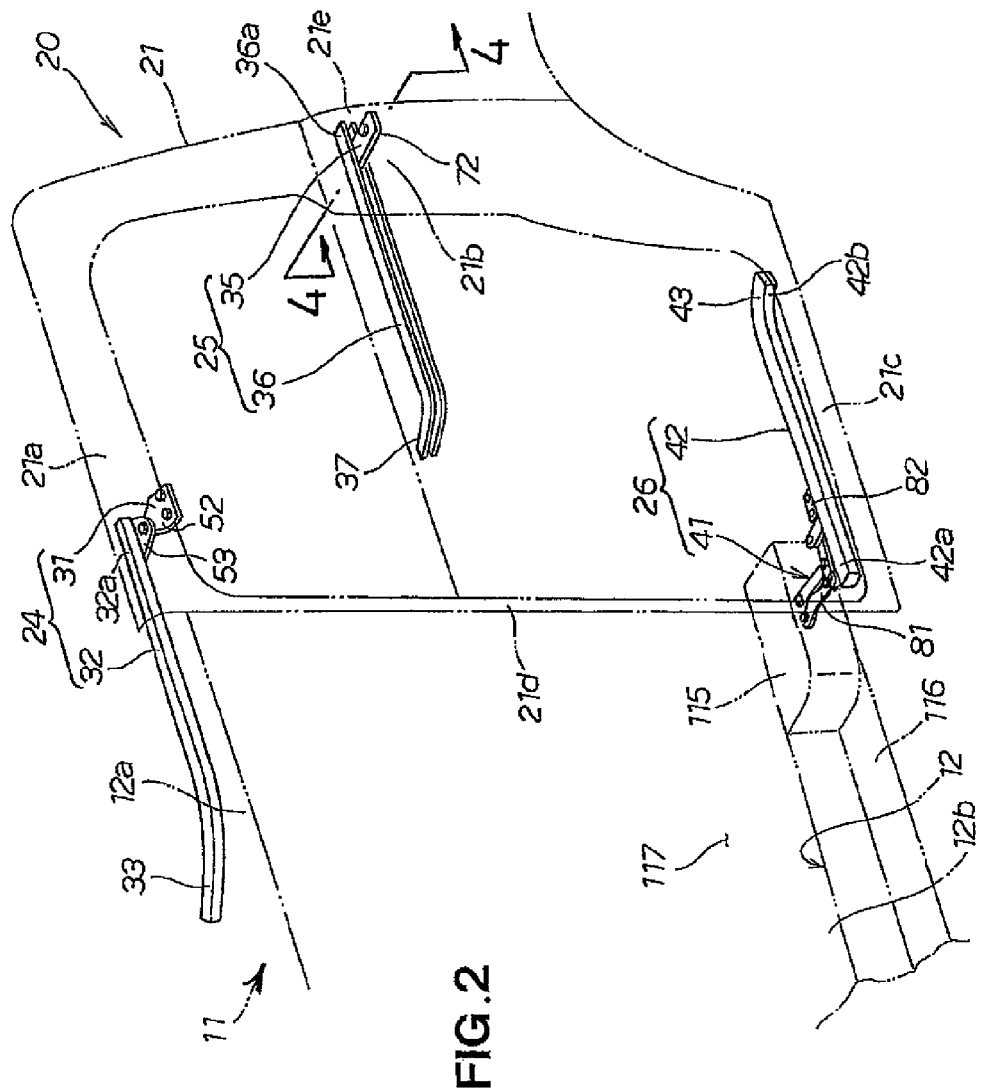
FIG. 2 is a perspective view showing the vehicle slide door of FIG. 1 in an opened position.

Reference is now made to FIG. 1 showing in perspective an embodiment of a vehicle slide door structure of the present invention in a closed position, and to FIG. 2 showing in perspective the vehicle slide door structure in an opened position.

The vehicle has a slide door opening section 12 formed in the left side of a vehicle body 11, and it includes the vehicle slide door structure 20 provided on the left side of the vehicle body 11 for opening and closing the slide door opening section 12. The slide door opening section 12 provides a getting in/off space or opening through which a passenger gets in and off the vehicle, and it is formed in a substantially rectangular shape with upper and lower edge regions 12a and 12b and front and rear edge regions.

The vehicle slide door structure 20 includes a slide door 21 for opening and closing the slide door opening section 12, an upper support unit 24 for supporting an upper portion 21a of the slide door 21, an intermediate (i.e., vertically-middle) support unit 25 for supporting a rear intermediate portion 21b of the slide door 21, and a lower support unit 26 for supporting a lower portion 21c of the slide door 21.

The slide door 21 has a rectangular shape with the upper and lower portions 21a and 21c as well as front and rear portions 21d and 21e, and it is slidingly openable/closable along the vehicle body 11.

The upper support unit 24 includes a guide section (hereinafter referred to as "upper guide section") 31 provided on the upper portion 21a of the slide door 21, and a slide rail (hereinafter referred to as "upper slide rail") 32 for guiding the upper guide section 31. The upper slide rail 32 is provided on the upper edge region 12a of the slide door opening section 12 and has a curved portion 33 formed on a front end region thereof. The curved portion 33 is a portion curved inwardly so as to guide the slide door 21 toward the vehicle body 11 as the slide door 21 is closed.

The intermediate support unit 25 includes a guide section (hereinafter referred to as "intermediate guide section") 35 provided on the rear intermediate portion 21b of the slide door 21, and a slide rail (hereinafter referred to as "intermediate slide rail") 36 for guiding the intermediate guide section 35. The intermediate slide rail 36 is provided on and extends rearwardly from the rear edge region of the slide door opening section 21 and has a curved portion 37 formed on a front end region thereof. The curved portion 37 is a portion curved inwardly so as to guide the slide door 21 toward the vehicle body 11 as the slide door 21 is closed.

The lower support unit 26 includes a guide section (hereinafter referred to as "lower guide section") 41 provided on the lower edge region 12b of the slide door opening section 12, and a slide rail (hereinafter referred to as "lower slide rail") 42 for guiding the lower guide section 36. The lower slide rail 42 is provided on the lower portion 21c of the slide door 21 and has a curved portion 43 formed on a rear end region 42b (i.e., end region in an opening direction of the slide door 21) of the lower slide rail 42. The curved portion 43 is a portion curved outwardly so as to guide the slide door 21 away from the vehicle body 11 as the slide door 21 is opened.

In the slide door structure 20, the upper, intermediate and lower support units 24, 25 and 26 are held in positions shown in FIG. 1 when the slide door 21 is in the closed position. Namely, the upper guide section 31 is located on the curved portion 33 of the upper slide rail 32, the intermediate guide section 35 is located on the curved portion 37 of the intermediate slide rail 36, and the lower guide section 41 is located on the curved portion 43 of the lower slide rail 42.

As the slide door 21 is moved open in an arrowed direction in the aforementioned state, the upper and intermediate guide sections 31 and 35 are moved from the respective curved portions 33 and 37 toward the rear of the vehicle, and simultaneously, the lower slide rail 42 is moved toward the rear of the vehicle together with the slide door 21.

FIG. 2 shows the slide door 21 having been moved to its fully opened position. When the slide door 21 is in the fully-opened position, the upper, intermediate and lower support units 24, 25 and 26 are held in positions shown in FIG. 2.

Namely, when the slide door 21 is in the fully opened position, the upper guide section 31 is located on a rear end portion 32a of the upper slide rail 32, the intermediate guide section 35 is located on a rear end portion 36a of the intermediate slide rail 36, and the lower guide section 41 is located on a front end portion 42a of the lower slide rail 42.

Figure 3:
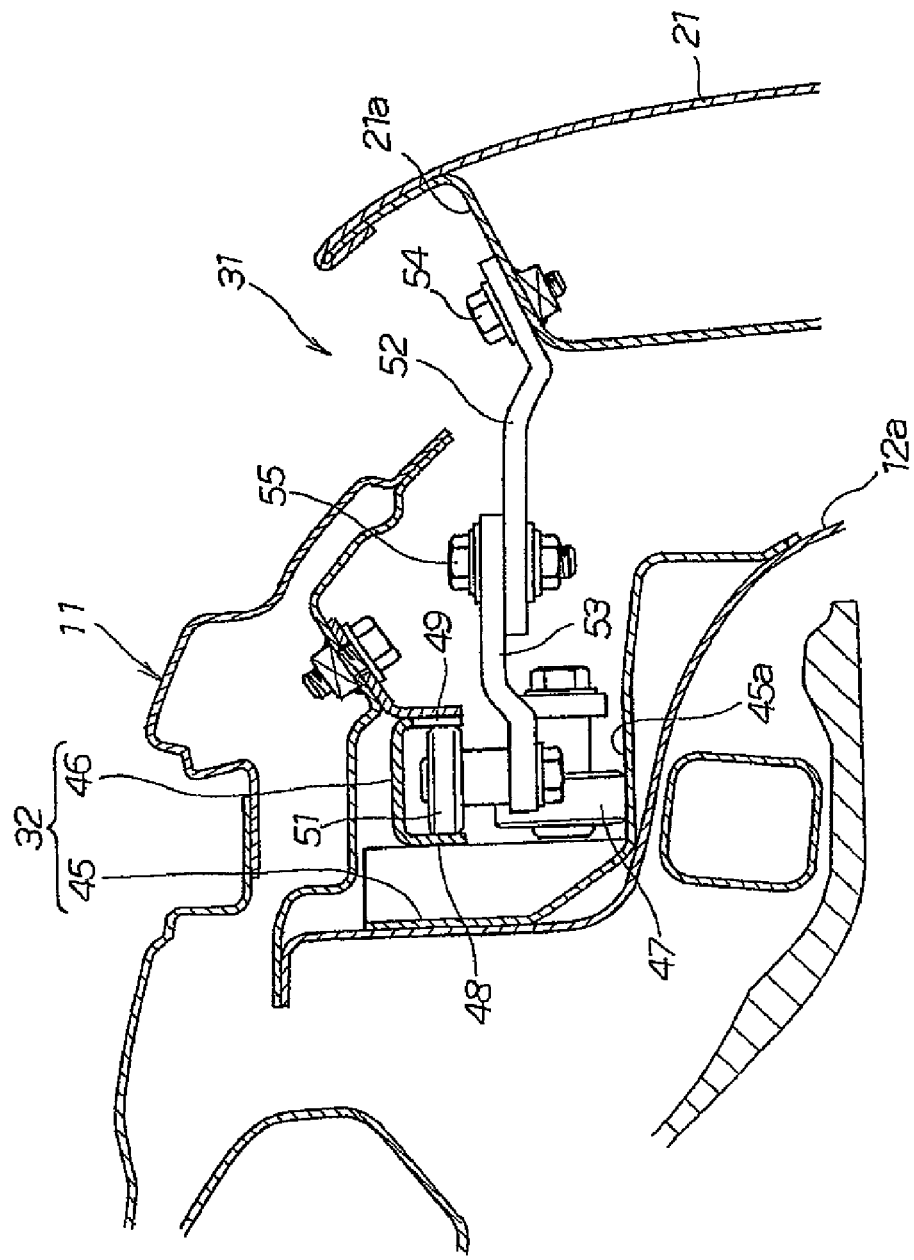
FIG. 3 is a sectional view taken along line 3-3 of FIG. 1.

FIG. 3 is a sectional view taken along the 3-3 line of FIG. 1. The upper slide rail 32 includes a first upper rail section 45 provided on the upper edge region 12a of the slide door opening section 12 shown in FIG. 2, and a second upper rail section 46 provided on the first upper rail section 45.

The first upper rail section 45 has a bottom portion 45a having a vertically oriented roller (hereinafter referred to as "vertical roller") 47 placed thereon. The second upper rail section 46 is formed in a downwardly-opening channel (i.e., inverted U) sectional shape and thereby has inner and outer guide wall portions 48 and 49. A pair of horizontally oriented rollers (hereinafter referred to as "horizontal rollers") 51 are sandwiched between the inner and outer guide wall portions 48 and 49.

The upper guide section 31 includes a fixed bracket 52 fixed to the upper portion 21a of the slide door 21 by means of a bolt 54, a pivotable bracket 53 pivotably supported on the fixed bracket 52 by means of a bolt 55, and the vertical roller 47 and horizontal rollers 51 connected to the pivotable bracket 53.

The vertical roller 47 is movable on and along the bottom portion 45a of the first upper rail section 45 so as to restrict downward movement of the slide door 21. Namely, the vertical roller 47 can support the weight of the slide door 21.

The horizontal rollers 51 are disposed between and movable on and along the inner and outer guide wall portions 48 and 49 so as to restrict horizontal movement of the slide door 21. Namely, the horizontal rollers 51 can prevent unwanted rattling movement of the slide door 21 in an inward-outward (i.e., width) direction of the vehicle.

Figure 4:
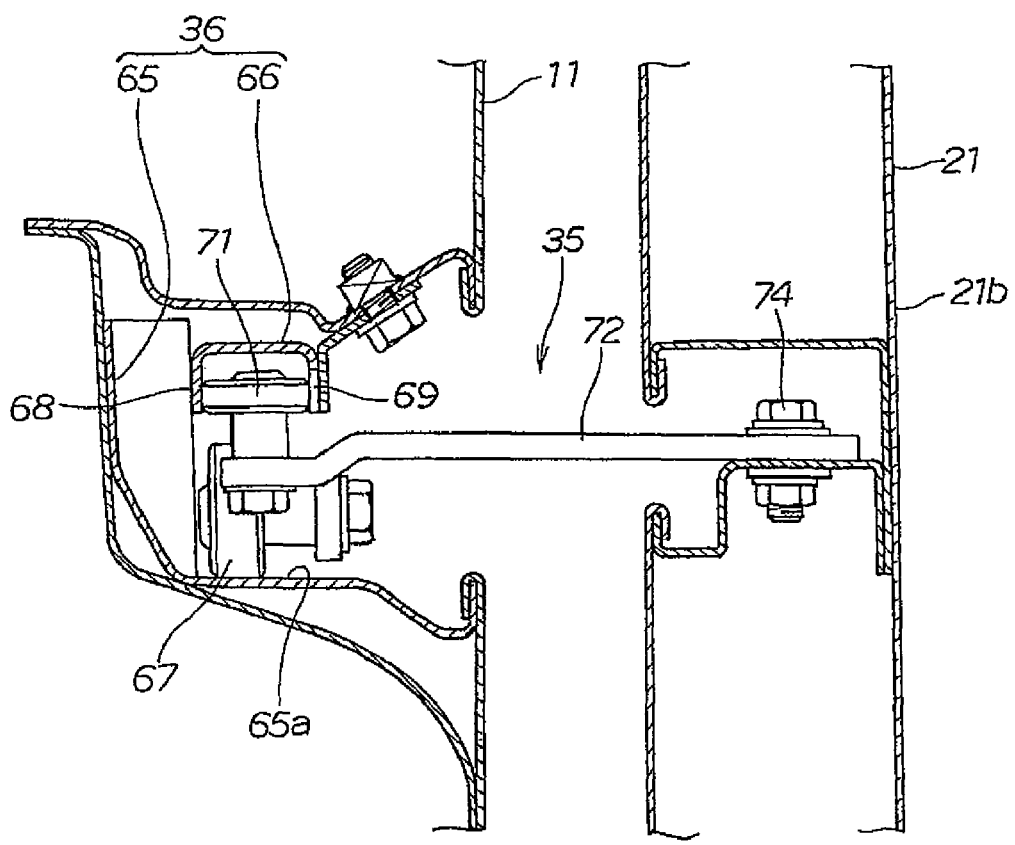
FIG. 4 is a sectional view taken along line 4-4 of FIG. 2.

FIG. 4 is a sectional view taken along line 4-4 of FIG. 2. The intermediate slide rail 36 includes a first intermediate rail section 65 provided on and extending from the rear edge region of the slide door opening section 12, and a second intermediate rail section 66 provided on the first intermediate rail section 65.

The first intermediate rail section 65 has a bottom portion 65a having a vertical roller 67 placed thereon. The second intermediate rail section 66 is formed in a downwardly-opening channel (i.e., inverted U) sectional shape and thereby has inner and outer guide wall portions 68 and 69. A pair of horizontal rollers 71 are sandwiched between the inner and outer guide wall portions 68 and 69.

The intermediate guide section 35 includes a pivotable bracket 72 pivotably supported on the rear intermediate portion 21b of the slide door 21 by means of a bolt 74, and the vertical roller 67 and horizontal rollers 71 connected to the pivotable bracket 72.

The vertical roller 67 is movable on and along the bottom portion 65a of the first intermediate rail section 65 so as to restrict downward movement of the slide door 21. Namely, the vertical roller 67 can support the weight of the slide door 21.

The horizontal rollers 71 are disposed between movable on and along the inner and outer guide wall portions 68 and 69 so as to restrict horizontal movement of the slide door 21. Namely, the horizontal rollers 71 can prevent unwanted rattling movement of the slide door 21 in the inward-outward (i.e., width) direction of the vehicle.

Figure 5:
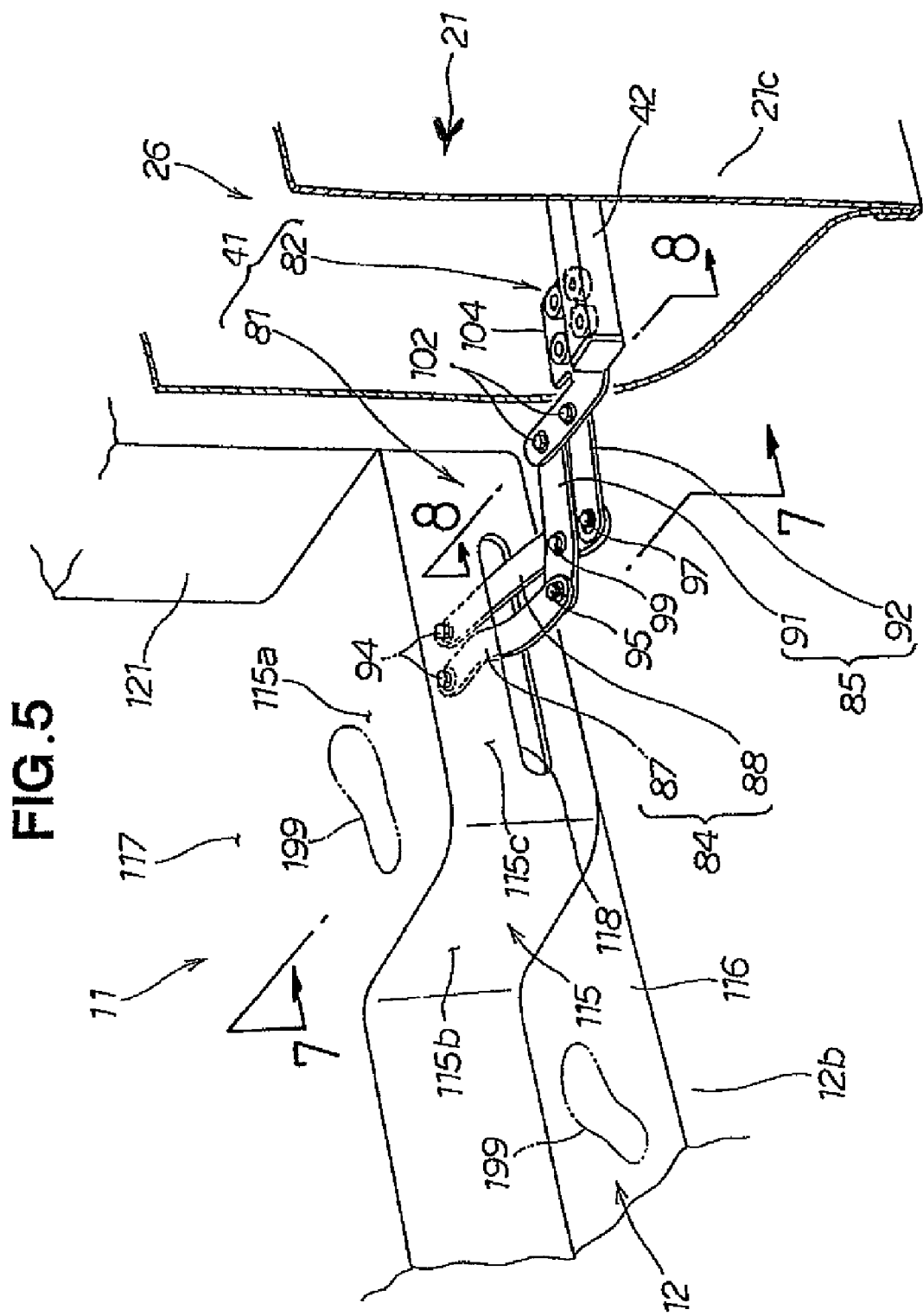
FIG. 5 is a perspective view showing a lower support unit of the vehicle slide door of FIG. 1.
Figure 6:
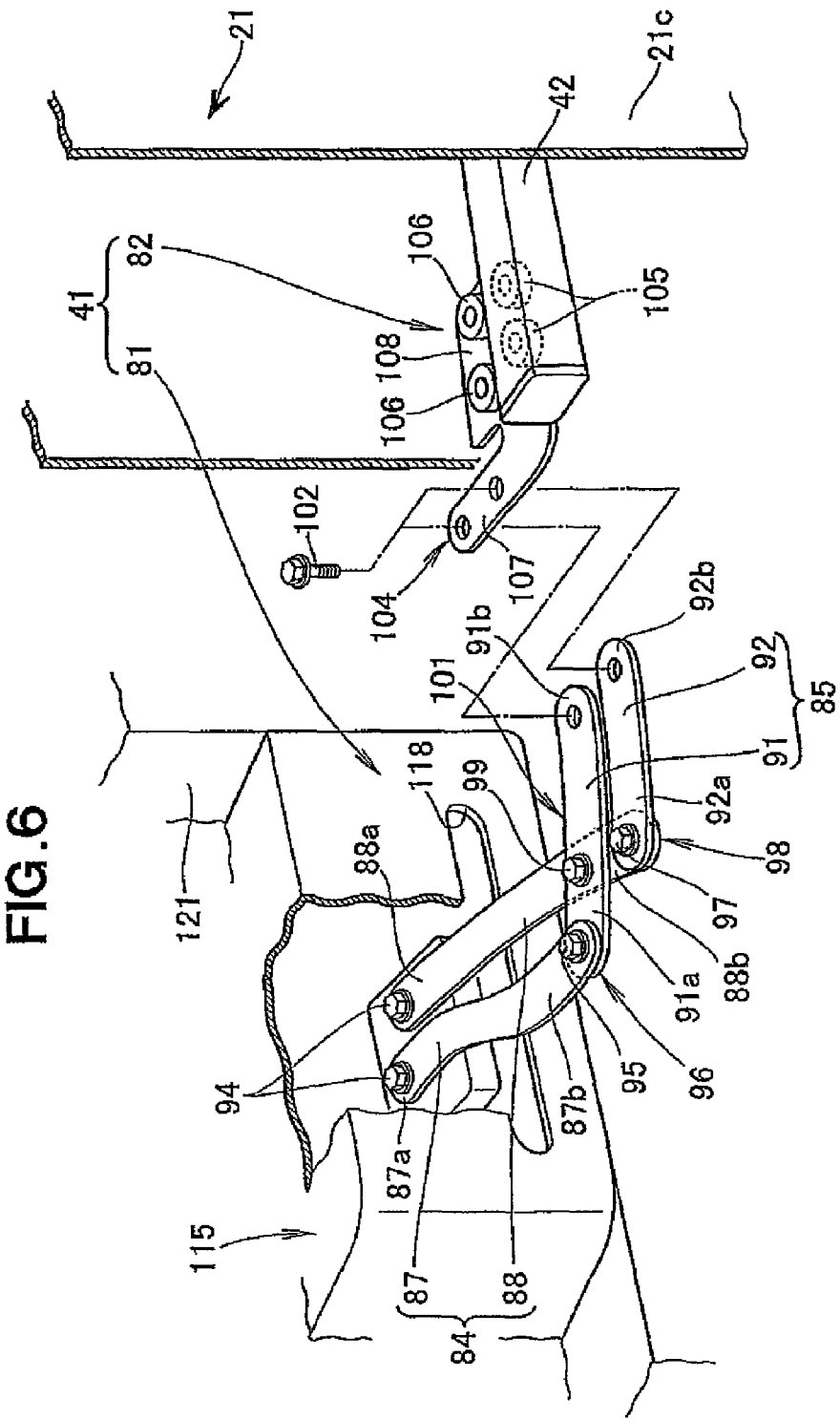
FIG. 6 is an exploded view of the lower support unit.

FIG. 5 is a perspective view showing the lower support unit 26, and FIG. 6 is an exploded view of the lower support unit 26. The lower guide section 41 includes a link mechanism 81 disposed between the vehicle body 11 and the lower slide rail 42, and a guide mechanism 82 connected to the link mechanism 81.

The link mechanism 81 includes a vehicle-body-side linkage or link member 84 and a door-side linkage or link member 85. The vehicle-body-side linkage 84 is provided on the vehicle body 11, while the door-side linkage 85 is provided on the slide door 21.

The vehicle-body-side linkage or link member 84 includes a first vehicle-body-side link 87 and second vehicle-body-side link 88 that are disposed in parallel to each other. The door-side linkage or link member 85 includes a first door-side link 91 and second door-side link 92 that are disposed in parallel to each other.

The first vehicle-body-side link 87 and second vehicle-body-side link 88 are pivotably connected at their respective proximal end portions 87a and 88a to the vehicle body 11 by means of bolts 94.

The link mechanism 81 also includes a first connection section 96 where the first door-side link 91 is pivotably connected at its proximal end portion 91a to a distal end portion 87b of the first vehicle-body-side link 87 by means of a bolt 95, and a second connection section 98 where the second door-side link 92 is pivotably connected at its proximal end portion 92a to a distal end portion 88b of the second vehicle-body-side link 88 by means of a bolt 97. The link mechanism 81 further includes a third connection section 101 where the first door-side link 91 is pivotably connected at its near-proximal-end portion to a near-distal-end portion of the second vehicle-body-side link 88 by means of a bolt 99.

Namely, the first vehicle-body-side link 87 and the second vehicle-body-side link 88 are pivotably connected at their respective proximal end portions 87a and 88a, constituting one end portion of the link mechanism 81, to the vehicle body 11 by means of the bolts 94. The first to third connection sections 96, 98 and 101 are where the vehicle-body-side linkage 84 and the door-side linkage 85 are pivotably connected with each other through the aforementioned pivotal connections between the proximal end portions 87a and 88a of the vehicle-body-side linkage 84 (i.e., one end portion of the link mechanism 81) and the distal end portions 91b and 92b of the door-side linkage 85 (i.e., the other end portion of the link mechanism 81).

The guide mechanism 82 is connected to the distal end portions 91b and 92b of the door-side linkage 85 by means of bolts 102. The guide mechanism 82 includes a movable bracket 104 connected to the respective distal end portions 91b and 92b of the first and second door-side links 91 and 92, and a plurality of horizontal rollers 105 and 106 provided on the movable bracket 104.

The movable bracket 104 includes an arm section 107 pivotably connected to the respective distal end portions 91b and 92b of the first and second door-side links 91 and 92 by means of the bolts 102, and a roller support section 108 formed integrally with the arm section 107 and pivotably supporting thereon the horizontal rollers 105 and 106. In an alternative, the roller support section 108 may be provided on the door-side linkage 85.

Namely, the distal end portions 91b and 92b of the first and second door-side links 91 and 92, constituting the other end portion of the link mechanism 81, are pivotably and slidably connected to the lower slide rail 42 via the guide mechanism 82.

The link mechanism 81 is accommodated in a cover 115 (see also FIG. 9B). The cover 115 is formed at the rear end of a step 116, and the step 116 is provided, on the lower edge portion 12b of the slide door opening section 12, as a support for the passenger to put his or her foot on in getting in/off the vehicle.

The lower slide rail 42 is provided on the lower portion 21c of the slide door 21, rather than on the lower edge portion 12b of the slide door opening section 12. Therefore, the lower edge portion 12b of the slide door opening section 12 can be located lower than a vehicle floor 117. In this way, the step 116 for the passenger to put his or her foot on in getting in/off the vehicle can be provided lower than the vehicle floor 117.

The cover 115, which is formed at the rear end of the step 116, is a housing formed in a substantially cubic shape with upper, front and side wall portions 115a, 115b and 115c, as seen in FIG. 5.

The upper wall portion 115a is a flat horizontal wall portion provided in flush with (i.e., at the same height as) the vehicle floor 117. The front wall portion 115b is a vertical wall portion extending from the front edge of the upper wall portion 115a down to the step 116. The side wall portion 115c is a vertical wall portion extending from a side edge of the upper wall portion 115a down to the step 116.

The side wall portion 115c has an elongated hole 118 formed therein and extending in the front-rear direction of the vehicle. The elongated hole 118 is an opening for allowing the vehicle-body-side linkage 84 (first vehicle-body-side link 87 and second vehicle-body-side link 88) to project therethrough to outside of the cover 115.

With the lower slide rail 42 provided on the lower portion 21c of the slide door 21 and the cover 115 provided at the rear end of the step 116, the passenger can readily get in/off the vehicle in a comfortable posture. Namely, when the passenger wants to get in the vehicle through the slide door opening section 12, for example, the passenger can readily get onto the vehicle floor 117 in a comfortable posture by putting his or her foot 199 first on the step 116 and then on the upper wall portion 115a. When the passenger wants to get off the vehicle, he or she can do so in a comfortable posture through the slide door opening section 12 in a similar manner to the aforementioned.

Figure 7:
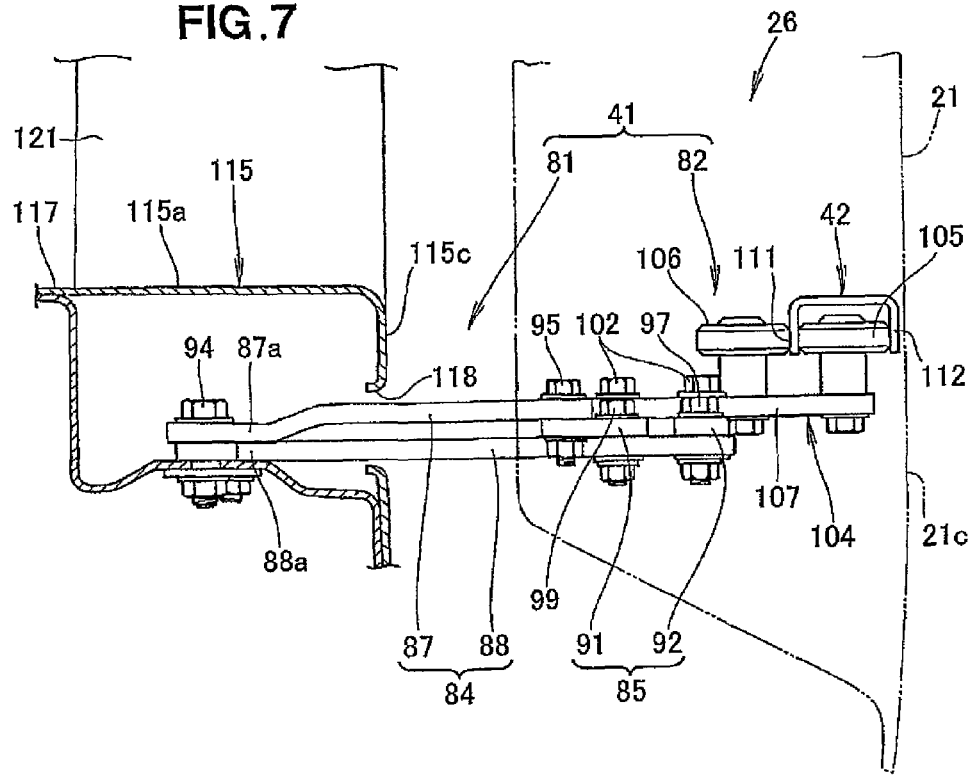
FIG. 7 is a sectional view taken along line 7-7 of FIG. 5.
Figure 8:
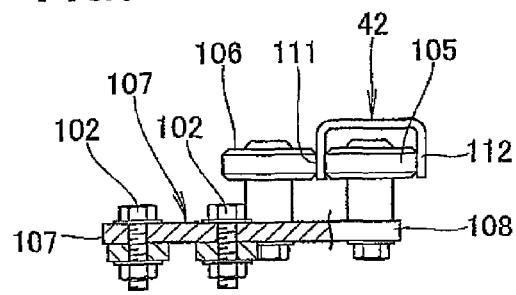
FIG. 8 is a sectional view taken along line 8-8 of FIG. 5.

FIG. 7 is a sectional view taken along the 7-7 line of FIG. 5, and FIG. 8 is a sectional view taken along the 8-8 line of FIG. 5. The lower slide rail 42 is provided on the lower portion 21c of the slide door 21 to extend in the front-rear direction of the vehicle.

The lower slide rail 42 is formed in a downwardly-opening channel (i.e., inverted U) sectional shape so that it has inner and outer guide wall portions 111 and 112. The two outer horizontal rollers 105 are sandwiched between the inner and outer guide wall portions 111 and 112. The two inner horizontal rollers 106 are held in abutment against the inner guide wall portion 111.

The two outer horizontal rollers 105 and two inner horizontal rollers 106 are movable along the inner and outer guide wall portions 111 and 112 so as to restrict horizontal movement of the slide door 21. In this way, it is possible to prevent unwanted rattling movement of the slide door 21 in the inward-outward (i.e., width) direction of the vehicle.

In the vehicle slide door structure 20, the upper vertical roller 47 of the upper guide section shown in FIG. 3 and intermediate vertical roller 67 of the intermediated guide section shown in FIG. 4 can support the weight of the slide door 21. Thus, the lower support unit 26 need not have a separate vertical roller for supporting the weight of the slide door 21. Consequently, it is possible to make the guide mechanism 82 of the lower support unit 26 more compact and thus readily provide the guide mechanism 82 within the slide door 21.

Further, in the vehicle slide door structure 20, the upper horizontal roller 51 of the upper guide section shown in FIG. 3, intermediate horizontal roller 71 of the intermediated guide section shown in FIG. 4 and the outer and inner lower horizontal rollers 105 and 106 of the lower guide section shown in FIG. 8 can prevent unwanted rattling movement of the slide door 21 in the inward-outward (i.e., width) direction of the vehicle.

FIGS. 9A and 9B are plan views explanatory of the link mechanism 81 employed in the vehicle slide door structure 20. FIG. 9A shows the slide door 21 in the opened position with the link mechanism 81 placed in an expanded position, and FIG. 9B shows the slide door 21 in the closed position with the link mechanism 81 placed in a contracted or collapsed position.

The link mechanism 81, which is disposed between the vehicle body 11 and the lower slide rail 42 provided on the slide door 21, comprises a plurality of separate linkages, i.e. vehicle-body-side linkage 84 and door-side linkage 85, and these linkages 84 and 85 are pivotably connected with each other via the first to third connection sections 96, 98 and 101. Because the vehicle-body-side linkage 84 and door-side linkage 85 are separate components, each of the linkages 84 and 85 can have a reduced overall length.

As the slide door 21 is closed, the linkages 84 and 85 can be overlappingly collapsed as shown in FIG. 9B, while, as the slide door 21 is opened, the linkages 84 and 85 can be expanded as shown in FIG. 9A.

With the arrangement that the linkages 84 and 85 are overlappingly collapsed as the slide door 21 is closed, whereby it is possible to reduce the overall operating range of the vehicle-body-side linkage 84 and door-side linkage 85 during the opening/closing operation of the slide door 21.

Because the linkages 84 and 85 are overlappingly collapsed as the slide door 21 is closed, the link mechanism 81 in the collapsed position can have a reduced overall length L1. Thus, the cover 115 accommodating the link mechanism 81 can have a reduced overall length L2. Consequently, when the slide door 21 is in the opened position, there can be secured a sufficient getting in/off space in the slide door opening section 12, so that the passenger can readily get in/off the vehicle through the space in a comfortable posture.

Further, because the link mechanism 81 includes the first vehicle-body-side link 87 and second vehicle-body-side link 88 that are disposed in parallel to each other and the first and second door-side links 91 and 92 that are disposed in parallel to each other, the slide door 21 can be securely supported by the link mechanism 81 during the opening/closing operation of the slide door 21, so that unwanted rattling movement of the slide door 21 during the opening/closing operation can be reliably avoided.

In addition, as the slide door 21 is opened, the link mechanism 81 is expanded into a substantially L shape as shown in FIG. 9A. When the link mechanism 81 is in the L-shape expanded position, the door-side linkage 85 extends in the opening/closing direction of the slide door 21, and the vehicle-body-side linkage 84 extends in the inward-outward (i.e., width) direction of the vehicle body 11.

Further, the first door-side link 91 is pivotably connected at its proximal end portion 91a to the distal end portion 87b of the first vehicle-body-side link 87 by means of the bolt 95, and the first door-side link 91 is also pivotably connected at its near-proximal-end portion to the near-distal-end portion of the second vehicle-body-side link 88 by means of the bolt 99. Thus, when a load F1 has acted on the slide door 21, pulling force F2 acts on the first vehicle-body-side link 87 in a longitudinal direction of the link 87, and simultaneously, compressing force acts on the second vehicle-body-side link 88 in a longitudinal direction of the link 88. Such an arrangement can prevent the first vehicle-body-side link 87 from pivoting about the bolt 94 and thereby prevent the slide door 21 from moving toward the interior of the vehicle.

When a load F3 has acted on the slide door 21, on the other hand, compressing force F4 acts on the first vehicle-body-side link 87 in the longitudinal direction of the link 87, and simultaneously, pulling force acts on the second vehicle-body-side link 88 in the longitudinal direction of the link 88. Such an arrangement can prevent the first vehicle-body-side link 87 from pivoting about the bolt 94 and thereby prevent the slide door 21 from moving toward outside of the vehicle.

In the aforementioned manner, it is possible to prevent unwanted rattling movement, in the inward-outward direction, of the slide door 21 during the opening/closing operation of the slide door 21.

Further, as the slide door 21 is opened, the link mechanism 81 is expanded into a substantially L shape, as noted above. Thus, the respective distal end portions 91b and 92b of the first and second door-side links 91 and 92 can be located a distance L3 rearwardly of a rear pillar 121. Thus, the slide door 21 can be opened sufficiently toward the rear of the vehicle without being adversely influenced by the rear pillar 121. As a consequence, when the slide door 21 is in the opened position, the instant embodiment can reliably secure a sufficient getting in/off opening or space for the passenger to get in/off the vehicle.

As shown in FIG. 9B as well as in FIGS. 1 and 2, the lower slide rail 42 has the curved portion 43 formed on its one end portion in the slide-door opening direction (i.e., on its rear end portion). The remaining portion of the lower slide rail 42 other than the curved portion 43 will hereinafter be referred to as "straight rail portion 44".

With the curved portion 43 formed on the rear end portion of the lower slide rail 42, the plurality of the horizontal oriented rollers 105 and 106 is allowed to move smoothly from the curved portion 43 along the straight rail portion 44 during the opening/closing operation of the slide door 21. By thus allowing the horizontal rollers 105 and 106 to move smoothly along the straight rail portion 44, the link mechanism 81 can be smoothly expanded/collapsed.

In the aforementioned manner, it is possible for the passenger or the like to smoothly perform the operation for moving the slide door 21 outwardly away from the vehicle body in order to open the slide door 21 and the operation for moving the slide door 21 toward the interior of the vehicle body.

Next, with reference to FIGS. 10-12, a description will be given about how the slide door 21 is opened. In the vehicle slide door structure 20, the upper support unit 24 and the intermediate support unit 25 are similar in construction. Thus, the upper support unit 24 and the lower support unit 26 will be described below in detail with reference to FIGS. 10-12.

Figure 10A:
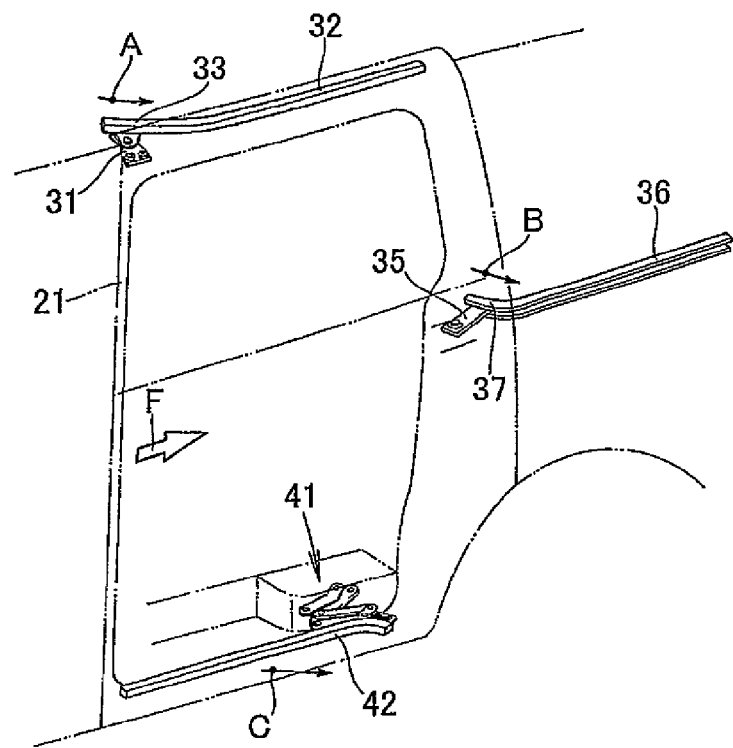
FIGS. 10A and 10B are perspective and plan views, respectively, of the slide door of FIG. 1, which particularly show how the slide door starts to be opened.
Figure 10B:
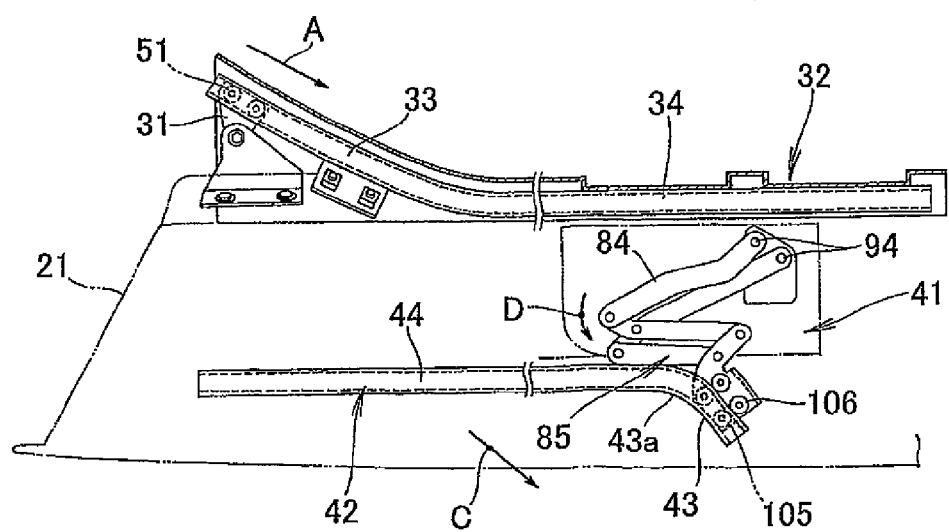

FIGS. 10A and 10B are perspective and plan views, respectively, of the slide door 21, which particularly show how the slide door 21 starts to be opened. As shown in FIG. 10A, the passenger or the like applies force F to the slide door 21 to open the slide door 21 toward the rear of the vehicle, during which time the horizontal rollers 51 of the upper guide section 31 (see also FIG. 3) move from the curved portion 33 of the upper slide rail 32 as indicated by arrow A. Simultaneously, the horizontal rollers 71 of the intermediate guide section 35 (see also FIG. 4) move from the curved portion 37 of the intermediate slide rail 36 as indicated by arrow B.

Thus, the slide door 21 moves not only outwardly away from the vehicle body but also toward the rear of the vehicle as indicated by arrow C, and the lower slide rail 42 moves together with the slide door 21 rearwardly as indicated by arrow C.

By the lower slide rail 42 moving rearwardly as indicated by arrow C as noted above, the curved portion 43 of the lower support unit 26 moves in the arrow C direction along the horizontal rollers 105 and 106 of the lower guide section 41, as shown in FIG. 10B. In this state, the curved portion 43 of the lower slide rail 42 is kept supported by the lower slide rail 42. In this way, it is possible to prevent unwanted rattling movement, in the inward-outward direction or width direction of the vehicle, of the slide door 21.

Further, by the curved portion 43 of the lower support unit 26 moving in the arrow C direction, a proximal end region 43a of the curved portion 43, merging with the straight rail portion 44, reaches the horizontal rollers 105 and 106. Thus, the horizontal rollers 105 and 106 move in the arrow C direction together with the proximal end region 43a of the curved portion 43, so that the vehicle-body-side linkage 84 and door-side linkage 85 of the link mechanism 81 start expanding in an arrow D direction by pivoting about the bolts 94.

Thus, in the upper support unit 24, the horizontal rollers 51 of the guide section 31 move from the curved portion 33 to a straight rail portion 34 of the upper slide rail 32 and then move along the straight rail portion 34. As a consequence, the movement of the slide door 21 switches from the outward movement away from the vehicle body 11 to the rearward movement along the vehicle body 11. Simultaneously, the vehicle-body-side linkage 84 and door-side linkage 85 of the link mechanism 81 are brought to a fully expanded position.

Figure 11A:
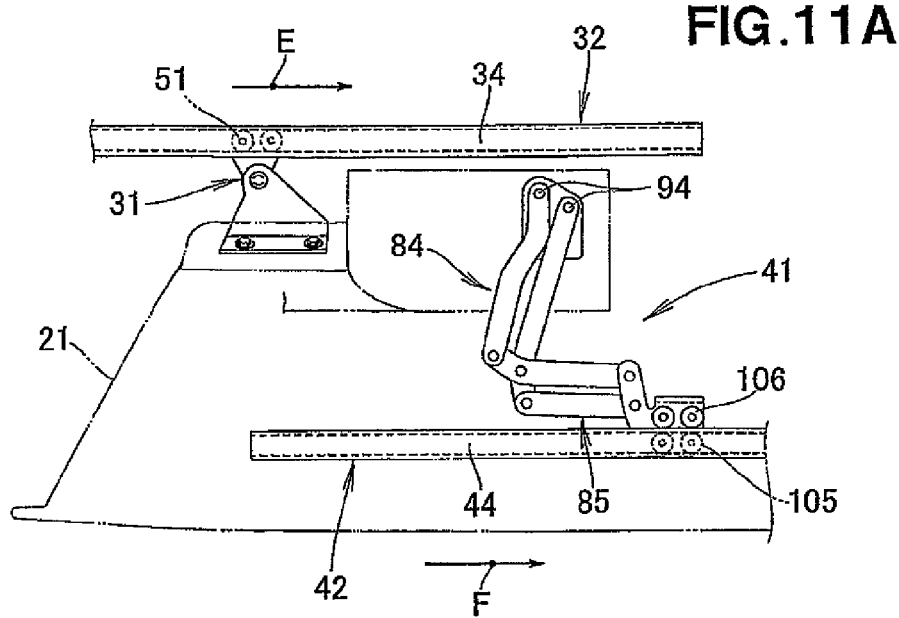
FIGS. 11A and 11B are views explanatory of how the slide door of FIG. 1 is moved to its fully opened position.
Figure 11B:
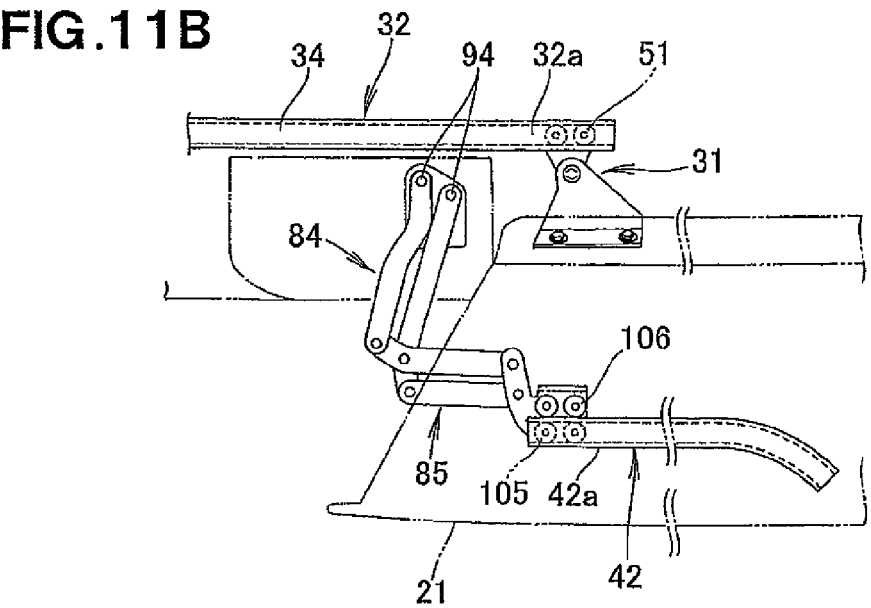

FIGS. 11A and 11B are views explanatory of how the slide door 21 is moved to its fully opened position. The horizontal rollers 51 of the upper guide section 31 move along the straight rail portion 34 as indicated by arrow E in FIG. 11A, so that the vehicle-body-side linkage 84 and door-side linkage 85 of the link mechanism 81 are brought to their fully expanded positions.

Further, by the horizontal rollers 51 moving along the straight rail portion 34 in the arrow E direction as noted above, the slide door 21 moves rearwardly along the vehicle body 11 as indicated by arrow F. The lower slide rail 42 moves in the arrow F direction together with the slide door 21. In this state, the straight rail portion 44 of the lower slide rail 42 is kept supported by the horizontal rollers 105 and 106, so that it is possible to prevent unwanted rattling movement, in the inward-outward direction or width direction of the vehicle, of the slide door 21.

Then, the horizontal rollers 51 of the upper support unit 24 reach and rest at the rear end portion 32a of the straight rail portion 34 of the upper rail 32, as shown in FIG. 11B. Simultaneously, the front end portion 42a of the straight rail portion 44 of the lower slide rail 42 reaches the horizontal rollers 105 and 106, so that the slide door 21 is brought to the fully opened position.

In this state too, the front end portion 42a of the lower slide rail 42 is kept supported by the horizontal rollers 105 and 106, so that it is possible to prevent unwanted rattling movement, in the inward-outward direction or width direction of the vehicle, of the slide door 21.

Figure 12:
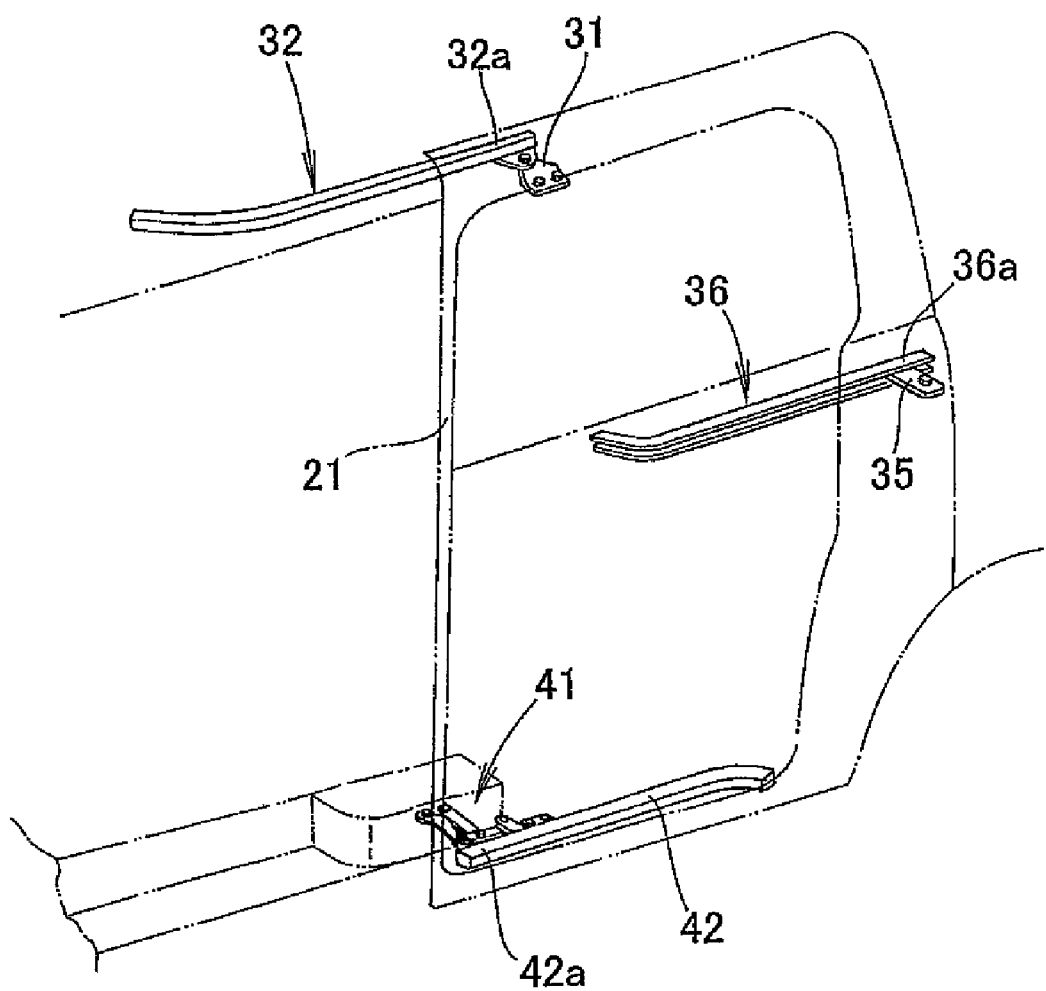
FIG. 12 is a view showing the slide door of FIG. 1 in the fully opened position.

FIG. 12 is a view showing the slide door in the fully opened position. When the slide door 21 is in the fully opened position, the upper guide section 31 is located on the rear end portion 32a of the upper slide rail 32, the intermediate guide section 35 is located on the rear end portion 36a of the intermediate slide rail 36, and the front end portion 42a of the lower slide rail 42 is located on the lower guide section 41.

Whereas the preferred embodiment has been described above in relation to the case where the vehicle-body-side linkage 84 and door-side linkage 85 of the link mechanism 81 are expanded into a substantially L shape, the present invention is not so limited; for example, the vehicle-body-side linkage 84 and door-side linkage 85 may be expanded into a substantially dogleg shape.

Further, the slide door opening section 12, slide door 21, lower slide rail 42, curved portion 43, link mechanism 81, vehicle-body-side linkage 84, door-side linkage 85, first and second vehicle-body-side links 87 and 88, first and second door-side links 91 and 92, first to third connection sections 96, 98 and 101, etc. employed in the embodiment are not necessarily limited to the above-described shapes, constructions, etc. and may be modified as necessary.

INDUSTRIAL APPLICABILITY

The present invention is particularly suited for application to automotive vehicles having a slide door openably/closably supported on the vehicle body.

The invention claimed is:

1. A vehicle slide door structure comprising:
    a lower slide rail provided on a slide door; and
    a link mechanism provided between a vehicle body and the slide rail, the link mechanism being pivotably connected at one end portion thereof to the vehicle body and slidably connected at another end portion thereof to the lower slide rail, the link mechanism including a plurality of link members and a connection section where the link members are pivotably connected with each other between the one end portion and the other end portion of the link mechanism such that the link members can be overlappingly collapsed as the slide door is closed and expanded as the slide door is opened.

2. The vehicle slide door structure of claim 1, wherein one end portion, in a slide-door opening direction, of the lower slide rail is curved concavely in an outward direction of the vehicle.

3. The vehicle slide door structure of claim 1, wherein the plurality of link members comprises at least one vehicle-body-side link member provided on the vehicle body and at least one door-side link member provided on the slide door, and the at least one vehicle-body-side link member and the at least one door-side link member are overlappingly collapsible in response to operation of the slide door.

4. The vehicle slide door structure of claim 1, wherein the plurality of link members comprises first and second vehicle-body-side link members provided on the vehicle body and disposed in parallel to each other, and first and second door-side link members provided on the slide door and disposed in parallel to each other.

5. The vehicle slide door structure of claim 4, wherein, when the slide door is in an opened position, the first and second door-side link members extend in an opening/closing direction of the slide door while the first and second vehicle-body-side link members extend in an inward-outward direction of the vehicle.

6. The vehicle slide door structure of claim 2, wherein the plurality of link members comprises at least one vehicle-body-side link member provided on the vehicle body and at least one door-side link member provided on the slide door, and the at least one vehicle-body-side link member and the at least one door-side link member are overlappingly collapsible in response to operation of the slide door.

7. The vehicle slide door structure of claim 2, wherein the plurality of link members comprises first and second vehicle-body-side link members provided on the vehicle body and disposed in parallel to each other, and first and second door-side link members provided on the slide door and disposed in parallel to each other.

8. The vehicle slide door structure of claim 1, further comprising a guide mechanism connected between lower slide rail and the other end portion of the link mechanism and through which the other end of the link mechanism is slidably connected to the lower slide rail.

9. The vehicle slide door structure of claim 8, wherein the other end of the link mechanism is also pivotably connected to the guide mechanism.

10. The vehicle slide door structure of claim 2, further comprising a guide mechanism connected between lower slide rail and the other end portion of the link mechanism and through which the other end of the link mechanism is slidably connected to the lower slide rail.

11. The vehicle slide door structure of claim 10, wherein the other end of the link mechanism is also pivotably connected to the guide mechanism.

* * * * *